Jan. 13, 1953 R. N. COLLINS 2,624,957
EDUCATIONAL DEVICE FOR USE IN LEARNING TO TIE CERTAIN KNOTS
Filed April 13, 1950 3 Sheets-Sheet 1
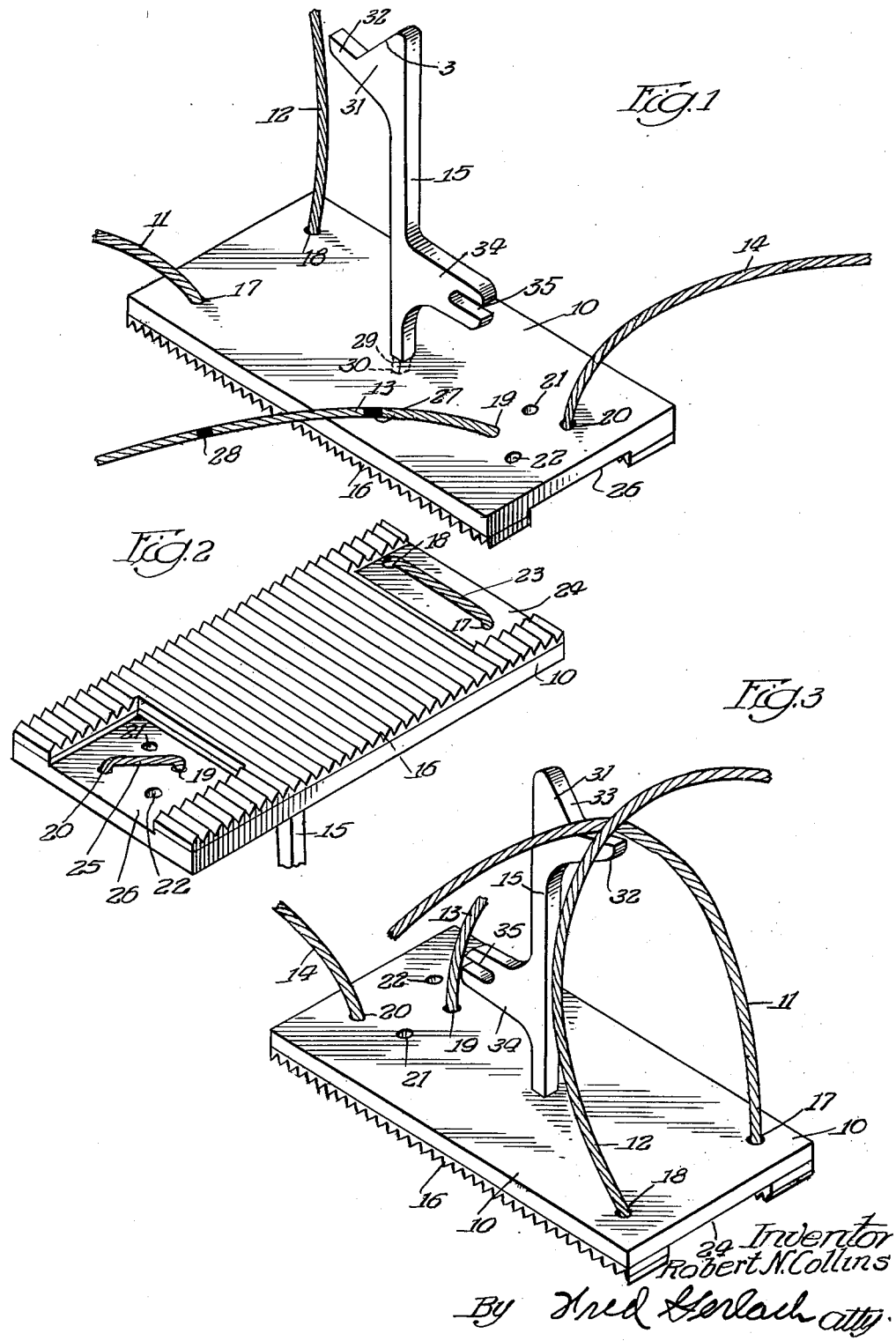
Inventor
Robert N. Collins
By Fred Gerlach atty.

Jan. 13, 1953 R. N. COLLINS 2,624,957
EDUCATIONAL DEVICE FOR USE IN LEARNING TO TIE CERTAIN KNOTS
Filed April 13, 1950 3 Sheets-Sheet 2
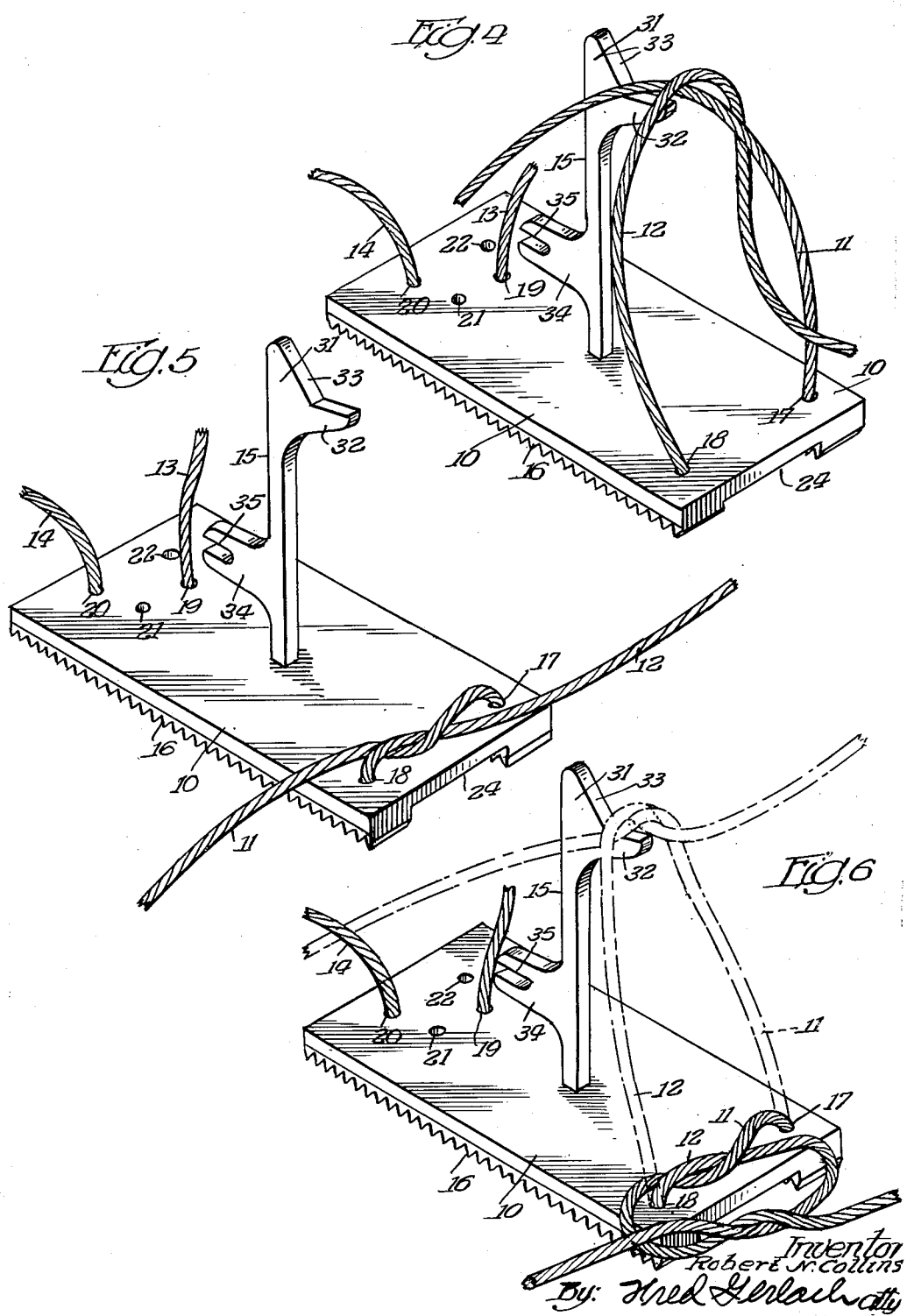

Jan. 13, 1953 R. N. COLLINS 2,624,957
EDUCATIONAL DEVICE FOR USE IN LEARNING TO TIE CERTAIN KNOTS
Filed April 13, 1950 3 Sheets-Sheet 3
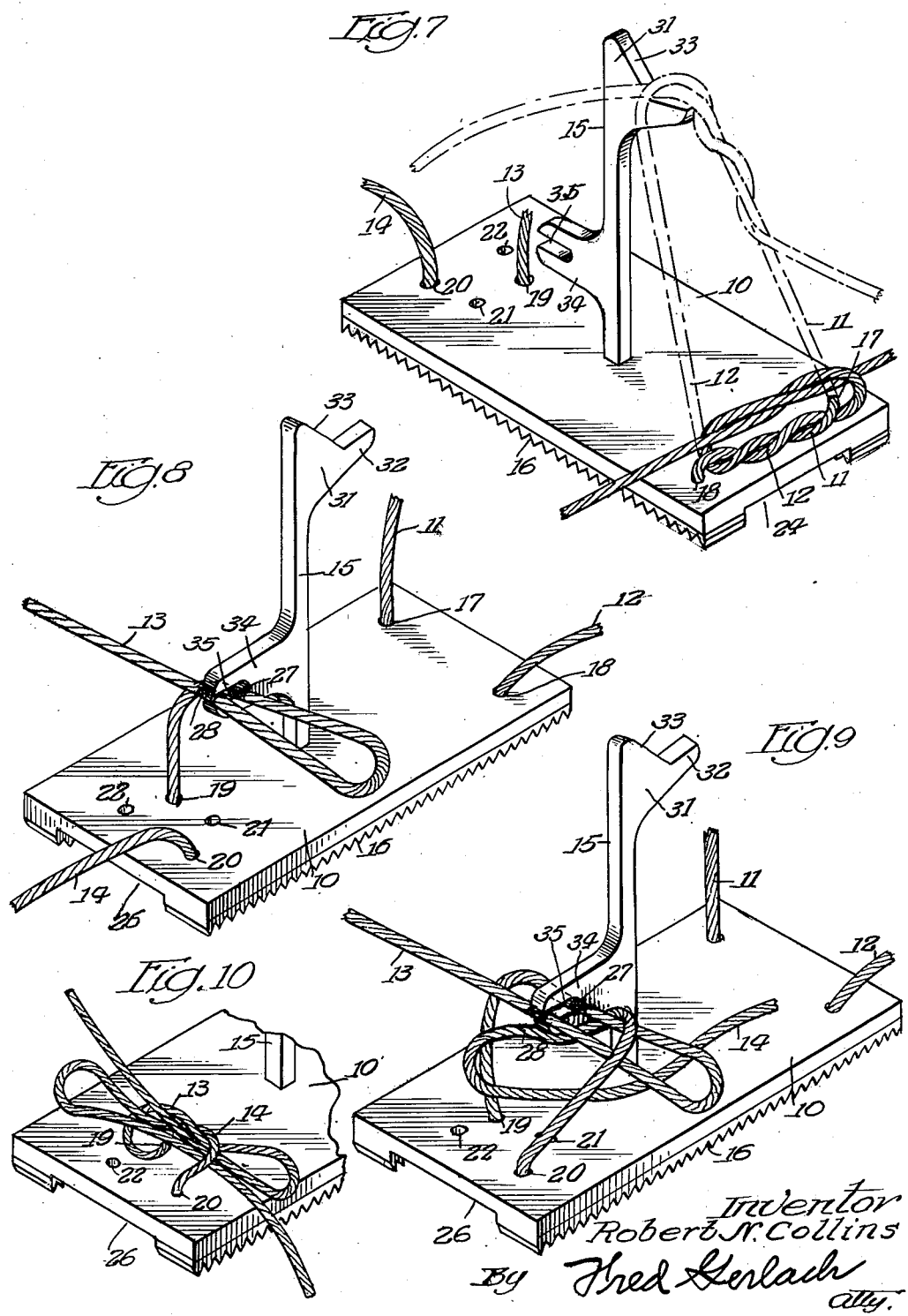

Patented Jan. 13, 1953

2,624,957

UNITED STATES PATENT OFFICE 2,624,957

EDUCATIONAL DEVICE FOR USE IN LEARNING TO TIE CERTAIN KNOTS

Robert N. Collins, Ridgefield, N. J.

Application April 13, 1950, Serial No. 155,734

11 Claims. (Cl. 35—1)

The present invention relates generally to educational devices. More particularly the invention relates to that type of educational device which is designed primarily for use by a child and serves as a medium or instrumentality for learning how to tie common knots, such, for example, as a bowknot or a square knot.

In connecting together the ends of a cord or other flexible element by a bowknot the ends of the cord are first joined by a single or overhand knot and then the bow part of the knot is formed by proper manipulation of the cord ends. During certain of the tying operations one hand of the tier is used to hold one or both ends of the cord while the other hand performs more active or intricate manipulations. Because both hands are generally brought into play it is extremely difficult for a child to learn or master the art of knot tying. Generally speaking, it is necessary for a child to learn what the operations of tying are and how to make the necessary manipulations to perform the operations and then to practice the operations and manipulations until sureness and dexterity are attained.

It is the principal object of this invention to provide a device which permits a child or other person readily to learn to tie various types of common knots, including principally the bowknot, and comprises facilities on which the operations and manipulations of tying knots may be easily and readily demonstrated to the child and the child may practice until he or she attains the necessary knowledge and dexterity to tie knots without use of the device. In general, the particular facilities of the device include means which function to hold the cord end or ends during tying and serve so to maintain the cord ends in proper relationship with respect to each other as to relieve one of the hands of the child of the holding function thereby aiding the child by reducing the amount of required cooperation between both hands and permitting him or her to devote full attention and the use of both hands to the other and more active manipulations of the various tying operations.

Additionally the invention contemplates as one of its objects the provision of an educational device which is essentially of unitary character and consists of two separate but coacting components, one of which serves as an aid in learning to tie a single knot (the first part of a bowknot), a square knot, or a surgeon's knot and the other of which serves as an aid in learning to tie the bow part of a bowknot.

A further object of the invention is to provide an educational device of the type and character under consideration which comprises an elongated base and an upstanding member on the central portion of the base and in which the component for use in tying a single knot, a square knot or a surgeon's knot consists of a pair of flexible elements at the corners of one end of the base and a supporting arm that is connected to the upper end of the upstanding member and projects in the direction of the one end of the base, and the other component for use in tying the bow part of a bowknot consists of a pair of flexible elements adjacent the corners of the other end of the base and a jaw that is connected to the central lower portion of the upstanding member of the device and projects in the direction of said other end of the base.

Other objects of the invention and the various advantages and characteristics of the present educational device will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a top perspective view of the educational device embodying the invention;

Figure 2 is a bottom perspective view;

Figures 3, 4 and 5 are perspective views showing in detail utilization or the manner of use of the component of the device that is used principally as a medium or aid in learning to tie a single or overhand knot;

Figure 6 is a fragmentary perspective view showing the manner in which the device is used in connection with tying of a square knot;

Figure 7 is a fragmentary perspective view showing the manner in which the device is used in connection with tying of a surgeon's knot; and Figures 8, 9 and 10 are perspective views showing in detail utilization or the manner of use of the other component of the device, i. e., the component which serves as an aid in learning to tie the bow part of a bowknot.

The device which is shown in the drawings constitutes the preferred form or embodiment of the invention. It is essentially an educational device for use by a child or other person and, as hereinafter described more in detail, serves as a medium or instrumentality for learning how to tie certain common knots, particularly a bowknot which is usually or generally employed in tying a shoelace. As its parts the device comprises an elongated base 10, a pair of flexible elements 11 and 12 at one end of the base, a pair of flexible elements 13 and 14 at the other end of the base and an upstanding member 15 on the central portion of the base.

The base 10 is preferably rectangular, although, if desired, it may be any other suitable shape. It is adapted in connection with use of the device to be placed on a horizontal supporting surface and, if desired, may be formed of a comparatively thick block of "plastic" material. Also, if desired, the base may be provided on the bottom surface thereof with a resilient pad 16 of rubber or other cushion-like material in order that the base, when placed on a supporting surface, will not mar the latter or slide. At one of its ends the base is provided with a pair of vertically extending holes 17 and 18 and at the other end thereof the base is provided with a pair of vertically extending holes 19 and 20 and a pair of vertically extending holes 21 and 22. The holes 17 and 18 extend completely through the one end of the base and are located respectively at the corners of said one end of the base. They are disposed equidistantly from the adjacent end edge of the base and are spaced equal distances from the side edges of the base. The holes 19 and 20 in the other end of the base extend completely through the base as is the case with the holes 21 and 22. The hole 19 is located at one side of the longitudinal center line of the base. It is spaced a certain distance inwards of the adjacent end edge of the base and is preferably spaced the same distance from the nearer side edge of the base. The hole 20 is located on the other side of the longitudinal center line of the base and is spaced from the adjacent end edge of the base approximately one-half the distance that the hole 19 is spaced from said end edge. As shown in the drawings the hole 20 is spaced from the nearer side edge of the base a distance slightly less than the hole 19 is spaced from the side edge of the base to which it is nearer. Generally speaking the holes 19 and 20 are located at opposite sides of the longitudinal center line of the base and offset longitudinally or lengthwise of the base for a reason to be explained hereafter. The hole 21 is positioned similarly to the hole 19 except that it is located on the opposite side of the longitudinal center line of the base. It is located inwards of the hole 20 and is spaced from the adjacent end edge of the base 10 the same distance as the hole 19. The hole 22 is positioned or located similarly to the hole 20 except that it is on the opposite side of the longitudinal center line of the base. It is disposed outwards of the hole 19 and is spaced from the adjacent end edge of the base the same distance as the hole 20.

The flexible element 11 extends upwards through the hole 17 and is materially longer than the upstanding member 15 of the device is high. The flexible element 12 extends upwards through the hole 18 and is preferably the same in length as the element 11. What may be considered the lower ends of the elements 11 and 12, i. e., the ends that are located adjacent the lower ends of the holes 17 and 18, are preferably joined together by a cross element 23. The latter is located in a recess 24 which is formed in the bottom of the base 10 and extends between and around the lower ends of said holes 17 and 18. If desired, the elements 11, 12 and 23 may be in the form of a single cord or shoelace. In assembling the device the free end of the element 11 is threaded upwards through the hole 17 and the free end of the element 12 is threaded upwards through the hole 18. Thereafter the two free ends of the elements 11 and 12 are drawn upwards until arrested as the result of the cross element 23 being brought into engagement with the surface of the base 10 that defines the top of the recess 24.

The flexible element 13 extends upwards through the hole 19 and is substantially as long as each of the elements 11 and 12. The flexible element 14 extends upwards through the hole 20 and, as shown in the drawings, is the same in length as the element 13. The ends of the elements 13 and 14 that are located adjacent the lower ends of the holes 19 and 20 are preferably joined together by a cross element 25 which is located in a recess 26. The latter is formed in the bottom portion of the base 10 and extends between and around the holes 19, 20, 21 and 22, as shown in Figure 2. The elements 13, 14 and 25 are in the form of a single cord or shoelace. In connection with assembly of the device the free end of the element 13 is threaded upwards through the hole 19 and the free end of the element 14 is threaded upwards through the hole 20. Thereafter the two free ends of the elements 13 and 14 are drawn upwards until arrested as the result of the cross element 25 being brought into engagement with the surface of the base 10 that defines the top of the recess 26. The flexible element 13 is provided with a pair of spaced apart markings 27 and 28. The latter may be formed by paint, thread or fabric and are of different color than the flexible element 13 so that they are readily visible. If the markings are formed of fabric they are stitched in place or applied by a suitable adhesive. The marking 27 is spaced a predetermined distance from the anchored end of the element 13, i. e., the end of the element that extends through the hole 19. The marking 28 is spaced a predetermined distance from the free end or extremity of the flexible element 13. The purpose of the two markings 27 and 28 will appear hereafter.

The upstanding member 15 is located at, and extends upwards from, the center of the base. It is preferably formed of the same material as the base and has at its lower end a reduced stem 29 of polygonal cross section. The stem fits snugly within a correspondingly shaped socket 30 in the central portion of the base and serves to secure the upstanding member 15 in fixed relation with the base. The upper end of the member 15 is provided with an integral substantially triangular enlargement 31 which projects in the direction of the end of the base that has the flexible elements 11 and 12 anchored to it. The apex or outer portion of the enlargement 31 has connected to it an arm 32. The latter is inclined upwards at a comparatively small angle with respect to the horizontal and forms with the flexible elements 11 and 12 a component or instrumentality whereby the child or other person using the device may learn to tie a single knot, a square knot or a surgeon's knot. The enlargement 31 and the arm 32 are preferably formed as integral parts of the upstanding member 15. The upper surface of the enlargement 31 is downwardly inclined toward the inner end of the arm 32 and constitutes a guide surface 33. On the central lower portion of the upstanding member 15 is a horizontally extending jaw equipped arm 34. The inner end of this arm is formed integrally with the member 15 and the outer end of the arm is horizontally notched to form a horizontal outwardly opening jaw 35. The jaw equipped arm 34 extends in the direction of the end of the base having the holes 19, 20, 21 and 22 and forms with the flexible elements 13 and 14 a component or instrumentality whereby the child or other person using the device may learn how to tie the bow part of a bowknot. The outer end of the arm 34 is spaced a small distance inwards from a vertical plane that extends through the holes 19 and 21.

When it is desired to use the component consisting of the flexible elements 11 and 12 and the upwardly inclined arm 32 at the upper end of the upstanding member 15 in connection with tying a left handed single knot the child or other user of the device faces said component and swings upwards the flexible element 11. The latter is then manipulated so that the central portion thereof extends from right to left over the arm 32 as viewed in Figure 3. Thereafter the flexible element 12 is swung upwards and manipulated so as to cause its central poriton to extend from left to right over the arm. After this operation the free end of the flexible element is swung around the lower portion of the element 11 and is then brought forwards between the lower portions of the two elements 11 and 12, as shown in Figure 4. Thereafter the free ends of the elements are grasped and pulled forwards so as to effect removal of the knotted portions from the arm. At the conclusion of this step the free ends are pulled away from one another with the result that the resultant left handed single knot is located on the subjacent portion of the base 10.

In the event it is desired to tie a right handed single knot the same procedure is followed except that the flexible element 12 is first placed over the arm 32 and then the element 11 is manipulated so as to cause its central portion to extend from right to left over the arm. After these steps or operations the free end of the element 11 is passed over and then inwards around the lower portion of the element 12. At the conclusion of this step the free ends of the elements 11 and 12 are moved forwards and then pulled away from one another so as to cause the resultant right handed single knot to overlie the portion of the base 10 that is between the holes 17 and 18. Should it be desired to tie a square knot the flexible elements 11 and 12 are first manipulated so as to form a left handed single knot as heretofore pointed out, and thereafter the free ends of the two elements are manipulated to form a right handed single knot on top of the previously formed left handed single knot, as shown in Figure 6 of the drawings. A square knot may also be tied by forming a right handed single knot first and then a left handed single knot on top of the right handed single knot. When it is desired to form a surgeon's knot the flexible element 11 is manipulated so that the central portion thereof extends from right to left over the arm 32. Thereafter the element 12 is manipulated so that its central portion extends from left to right across the arm. After this operation the free end of the flexible element 12 is swung around the lower portion of the element 11 and is also brought forwards between the lower portions of the two elements 11 and 12. Thereafter these two steps are repeated. At the conclusion of such steps the ends of the two elements are pulled away from the arm and are then drawn apart so as to cause the first part of the surgeon's knot to overlie the portion of the base 10 that is between the holes 17 and 18. After this operation the ends of the elements 11 and 12 are manipulated so as to form a right handed single knot on top of the previously formed knot, as shown in Figure 7.

When it is desired to utilize the component comprising the flexible elements 13 and 14 and the jaw equipped arm 34 in connection with tying of a left handed bow part of a bowknot the child or other user of the device faces such component and first places the portion of the element 13 that has the marking 27 in the inner end of the jaw 35 so that it extends from left to right, as shown in Figure 8. Then the element 13 is doubled back and manipulated so as to effect insertion in the jaw 35 of the portion of the element having the marking 28. These operations result in the formation of a loop which projects or extends to the right hand side of the horozintal arm 34. The flexible element 14 is then crossed over the loop at a point directly to the right of the jaw equipped arm 34. After this operation the portion of the element 14 which is between the crossed over portion and the end extremity is manipulated into the form of a loop and such loop is drawn forwards between the portions of the elements 13 and 14 that are between the holes 19 and 20 and the arm 34, as shown in Figure 9 of the drawings. After this particular operation the two loops are grasped at their ends and are pulled away from one another. The pulling step results in disconnection of the markings 27 and 28 on the flexible element 13 from the jaw 35 and the formation of a left handed bow part of a bowknot on the base as shown in Figure 10. The jaw 35 in the arm 34 is preferably spaced from the hole 19 a distance substantially equal to the distance between such hole and the marking 27 in order that when the marking 27 is inserted in the jaw the portion of the element 13 between the marking and the hole 19 will be taut. The hole 19 is inwardly offset with respect to the hole 20 in order that when a left handed bow part of a bowknot is formed as heretofore described the bow part will assume on the base 10 a position wherein it extends transversely of the base as shown in Figure 10. If the holes 19 and 20 were spaced equidistantly from the adjacent end edge of the base the bow part after formation would tend to assume a position wherein it extends lengthwise of the base.

When it is desired to form a right handed bow part of a bowknot the flexible elements 13 and 14 are removed from the holes 19 and 20 by pulling downwards on the cross element 25. Thereafter the free end of the element 13 is threaded upwards through the hole 21 and the free end of the element 14 is threaded upwards through the hole 22 in order to reverse the locations of the two elements. To tie a right handed bow part of a bowknot the portion of the element having the marking 27 is inserted into the inner end of the jaw 35 so that it extends from right to left. Thereafter the portion of the element 13 that is outwards of the marking 27 is formed into a loop and the portion with the marking 28 is inserted into the jaw 35 to the end that the loop extends to the left of the arm 34. Following this step or operation the flexible element 14 is crossed over the inner end of the loop at a point directly to the left of the arm 34 and is then manipulated into a loop which is drawn forwards between the portions of the elements 13 and 14 that are directly adjacent the holes 21 and 22. By applying tension in opposite directions to the two loops a right handed bow part of a bowknot is formed across the base 10.

The herein described device is essentially simple in design or construction and hence may be produced at a comparatively low cost. It effectively and efficiently fulfills its intended purpose and is characterized by the fact that it enables the user readily to learn to tie different types of knots, including a right or left handed single knot, a square knot, a surgeon's knot and the two parts of a right or left handed bowknot.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, an educational device designed for use as an aid in learning to tie certain knots including a single knot, and comprising a base, a pair of comparatively long flexible elements having certain ends thereof applied to a portion of the base, an upstanding member on another portion of the base, and an arm connected to the upstanding member at a point above the base, extending in the direction of said one portion of the base and adapted releasably to hold the intermediate portions of the elements in juxtaposition preliminary to the free end portions of the elements being manipulated to form a single knot.

2. As a new article of manufacture, an educational device designed for use as an aid in learning to tie certain knots including a single knot, and comprising a base, a pair of comparatively long flexible elements having certain ends thereof applied to a portion of the base, an upstanding member on another portion of the base, and an arm connected to the upper end of the upstanding member, extending in the direction of said one portion of the base, inclined upwards away from the member at a comparatively small angle with respect to the horizontal and adapted releasably to hold the intermediate portions of the elements in juxtaposition preliminary to the free end portions of the elements being manipulated to form a single knot.

3. As a new article of manufacture, an educational device designed for use as an aid in learning to tie certain knots including a single knot, and comprising a base with a pair of spaced apart holes extending vertically therethrough, an elongated cord having the intermediate part thereof underlying the base and its end parts extending upwards through the holes respectively and forming a pair of flexible elements, and means supported in an elevated position with respect to the base and arranged and adapted releasably to hold the intermediate portions of the elements in juxtaposition preliminary to the free end portions of the elements being manipulated to form a single knot.

4. As a new article of manufacture, an educational device designed for use as an aid in learning to tie certain knots including a single knot, and comprising a base provided in one portion thereof with a pair of spaced apart holes extending vertically therethrough, an elongated cord having the intermediate part thereof underlying the base and its end parts extending upwards through the holes respectively and forming a pair of flexible elements, an upstanding member on another portion of the base, and an arm connected to the upstanding member at a point above the base, extending in the direction of said one portion of the base and adapted releasably to hold the intermediate portions of the elements in juxtaposition preliminary to the free end portions of the elements being manipulated to form a single knot.

5. As a new article of manufacture, an educational device designed for use as an aid in learning to tie certain knots including a single knot, and comprising a base provided in one portion thereof with a pair of spaced apart holes extending vertically therethrough, an elongated cord having the intermediate part thereof underlying the base and its end parts extending upwards through the holes respectively and forming a pair of flexible elements, an upstanding member connected to another portion of the base and spaced equidistantly from said holes, and an arm connected to the upper end of the upstanding member extending in the direction of said one portion of the base, inclined upwards away from the member at a comparatively small angle with respect to the horizontal, and adapted releasably to hold the intermediate portions of the elements in juxtaposition preliminary to the free end portions of the elements being manipulated to form a single knot.

6. As a new article of manufacture, an educational device designed for use as an aid in learning to tie the bow part of a bowknot, and comprising a base, a pair of comparatively long flexible elements having certain of their ends applied to a portion of the base in spaced apart relation, an upstanding member on another portion of the base, and an arm connected to the upstanding member at a point above the base extending in the direction of said one portion of the base and having associated therewith means adapted when the intermediate portion of one of the elements is manipulated to form a loop releasably to hold the ends of the loop preliminary to formation of a second loop in the intermediate portion of the other element.

7. As a new article of manufacture, an educational device designed for use as an aid in learning to tie the bow part of a bowknot, and comprising a base, a pair of comparatively long flexible elements having certain of their ends applied to a portion of the base in spaced apart relation, an upstanding member connected to another portion of the base, and a substantially horizontal arm connected to the upstanding member at a point above the base, extending in the direction of said one portion of the base, and having its outer end shaped to form a jaw that is adapted when the intermediate portion of one of the elements is manipulated to form a loop releasably to hold the ends of the loop preliminary to formation of a second loop in the intermediate portion of the other element.

8. As a new article of manufacture, an educational device for use as an aid in learning to tie the bow part of a bowknot, and comprising a base provided in one portion thereof with a pair of spaced apart holes extending vertically therethrough, an elongated cord having the intermediate part thereof underlying the base and its end parts extending upwards through the holes respectively and forming a pair of flexible elements, an upstanding member on another portion of the base, a substantially horizontal arm connected to the upstanding member, extending in the direction of said one portion of the base and having the outer end thereof shaped to form a longitudinally extending jaw adapted when the intermediate portion of one of the elements is manipulated to form a loop releasably to hold the free ends of the loop in juxtaposition preliminary to formation of a second loop in the intermediate portion of the other element.

9. As a new article of manufacture, an educational device for use as an aid in learning to tie the bow part of a bowknot, and comprising a base provided in one portion thereof with a pair of spaced apart holes extending vertically therethrough, an elongated cord having the intermediate portion thereof underlying the base and its end parts extending upwards through the holes respectively and forming a pair of flexible elements, an upstanding member connected to another portion of the base and positioned so that it is nearer one of the holes than the other hole, and an arm connected to the upstanding member at a point above the base extending in the direction of said one portion of the base, and shaped to form a jaw adapted when the intermediate portion of the element that extends through the hole that is nearer the member is manipulated to form a loop releasably to hold the free ends of the loop in juxtaposition preliminary to formation of a second loop in the central portion of the other element.

10. As a new article of manufacture, an educational device designed for use as an aid in learning to tie the single knot part and the bow part of a bowknot, and comprising an elongated base, a first pair of comparatively long flexible elements having certain ends thereof applied to one end of the base, a second pair of comparatively long flexible elements having certain ends thereof applied to the other end of the base, an upstanding member on the central portion of the base, an arm connected to the upstanding member at a point above the base, extending in the direction of said one end of the base and adapted releasably to hold in juxtaposition the intermediate portions of the first pair of elements preliminary to the free end portions of said first pair of elements being manipulated to form a single knot, and a second arm connected to the upstanding member at a point above the base, extending in the direction of said other end of the base, and having associated therewith means adapted when the intermediate portion of one of the elements of the second pair is manipulated to form a loop releasably to hold the ends of the loop preliminary to formation of a second loop in the intermediate portion of the other element of said second pair.

11. As a new article of manufacture, an educational device designed for use as an aid in learning to tie the single knot part and the bow part of a bowknot, and comprising an elongated base, a first pair of comparatively long flexible elements having certain ends thereof applied to one end of the base in spaced apart relation, a second pair of comparatively long flexible elements having certain ends thereof applied to the other end of the base in spaced apart relation, an upstanding member on the central portion of the base, an arm connected to the upper end of the upstanding member, inclined slightly upwards in the direction of said one end of the base, and adapted releasably to hold in juxtaposition the intermediate portions of the first pair of elements preliminary to the free end portions of said first pair of elements being manipulated to form a single knot, and a second arm connected to the upstanding member at a point beneath the first mentioned arm, extending substantially horizontally in the direction of said other end of the base, and having the outer end thereof shaped to form a jaw adapted when the intermediate portion of one of the elements of the second pair is manipulated to form a loop releasably to hold in juxtaposition the ends of the loop preliminary to formation of a second loop in the intermediate portion of the other element of said second pair.

ROBERT N. COLLINS.

REFERENCES CITED

The following references are of record in the file of this patent:

UNITED STATES PATENTS

| Number | Name | Date |
| --- | --- | --- |
| 2,385,197 | Eisel | Sept. 18, 1945 |
| 2,469,037 | Harvey | May 3, 1949 |
| 2,498,920 | Holland | Feb. 28, 1950 |
| 2,505,279 | Duhaims | Apr. 25, 1950 |